Jan. 9, 1951        D. N. KITE        2,537,836
DEVICE FOR DEVEINING SHRIMPS

Filed April 11, 1949        2 Sheets-Sheet 1

INVENTOR.
Don N. Kite
BY
Attorney

Jan. 9, 1951     D. N. KITE     2,537,836
DEVICE FOR DEVEINING SHRIMPS
Filed April 11, 1949     2 Sheets-Sheet 2
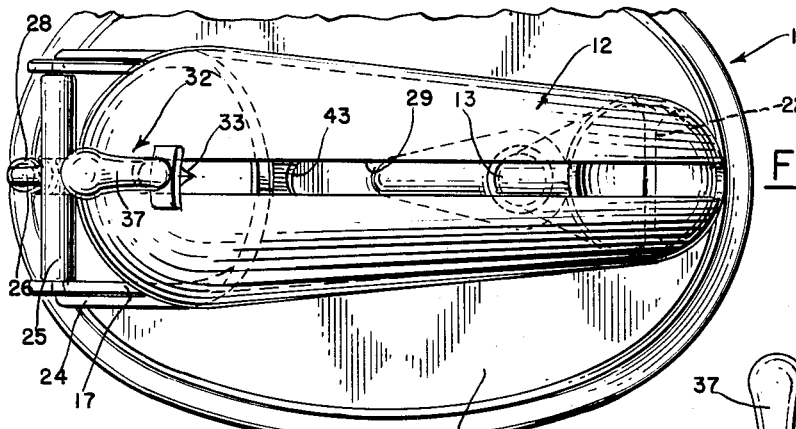
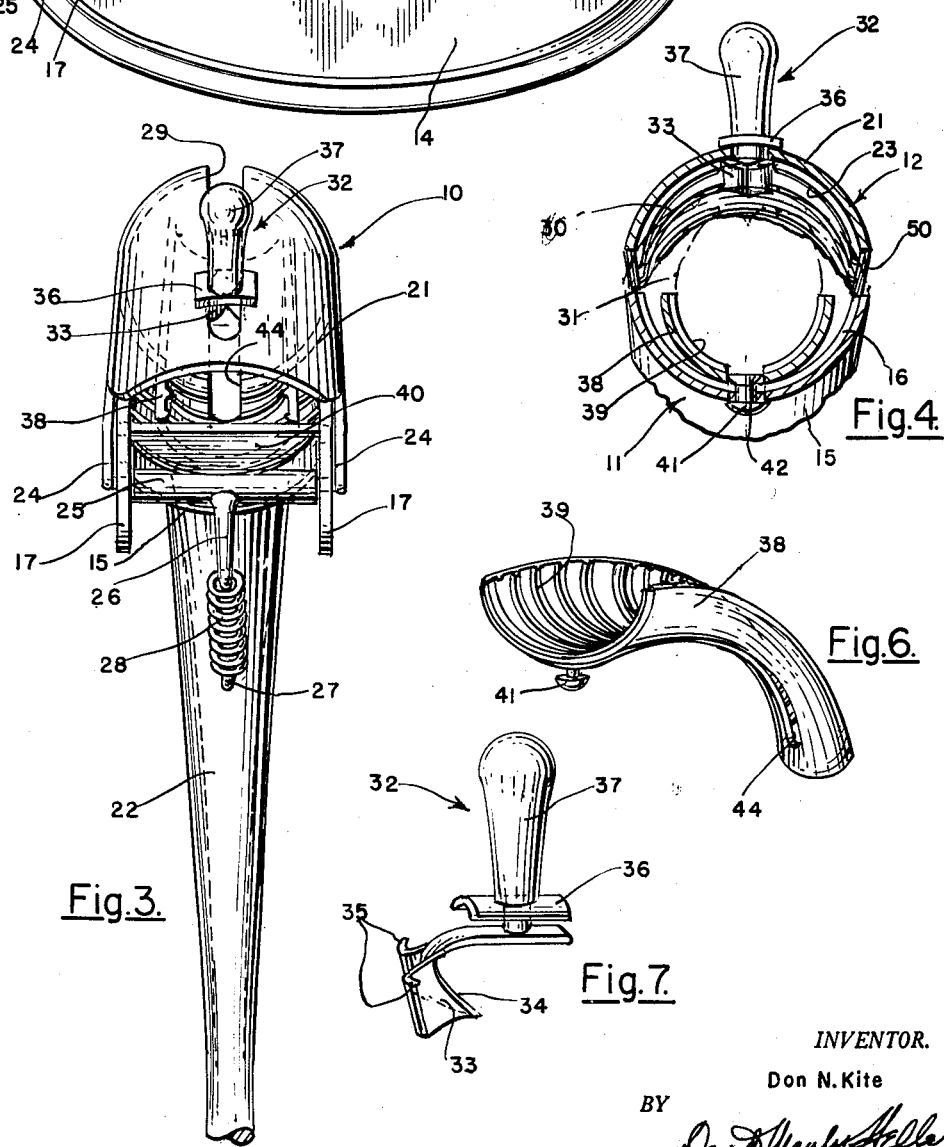
INVENTOR.
Don N. Kite
BY
Attorney Patented Jan. 9, 1951

2,537,836

UNITED STATES PATENT OFFICE 2,537,836

DEVICE FOR DEVEINING SHRIMPS

Don N. Kite, Hinsdale, Ill.; Mary Eileen Feldkamp, administratrix of said Don N. Kite, deceased, assignor to Mary Eileen Feldkamp and Mary Kathleen Kite.

Application April 11, 1949, Serial No. 86,843

6 Claims. (Cl. 17—2)

My invention relates to shrimp cleaning and shelling devices.

A prime object of my invention is to provide a shrimp cleaning and shelling device having fixed and articulate jaw means for holding a decapitated shrimp securely in place for the purpose of slitting its outer shell, and removing its vein element.

A further important object of my invention is to provide a shrimp cleaning and shelling device having guided knife means in connection therewith for the operation of shelling and deveining the shrimp.

A further object of my invention is to provide a shrimp cleaning and shelling device having an adjustable articulate jaw which in connection with auxiliary jaw means will accommodate shrimp of varying sizes.

A still further object of my invention is to provide a shrimp cleaning and shelling device having tension spring means between the fixed and movable jaws thereof to cause the said movable jaw to automatically open when released permitting the shelled shrimp to be removed.

A further object of my invention is to provide a shrimp cleaning and shelling device having a leg clearance slot longitudinally formed in the bottom of the lower jaw thereof to allow the feet of the shrimp to extend therethrough facilitating the removal thereof.

A still further object of my invention is to provide a shrimp cleaning and shelling device that is simply designed and may be economically manufactured in large quantities.

Other objects and advantages embraced in my invention will be disclosed in the following description and the accompanying illustrations wherein like parts are designated by like numerals and in which;

Fig. 2 is a top view of my invention taken looking in the direction of arrows 2—2 on Fig. 1.

Fig. 3 is a front view of my invention taken looking in the direction of arrows 3—3 on Fig. 1.

Fig. 4 is a cross-sectional view of my invention taken substantially on line 4—4 on Fig. 1.

Fig. 6 is a perspective view of the auxiliary jaw means used in connection with my invention.

Fig. 7 is an enlarged perspective view of the guided knife means used in connection with my invention.

Figures 1, 5, 8, 9:
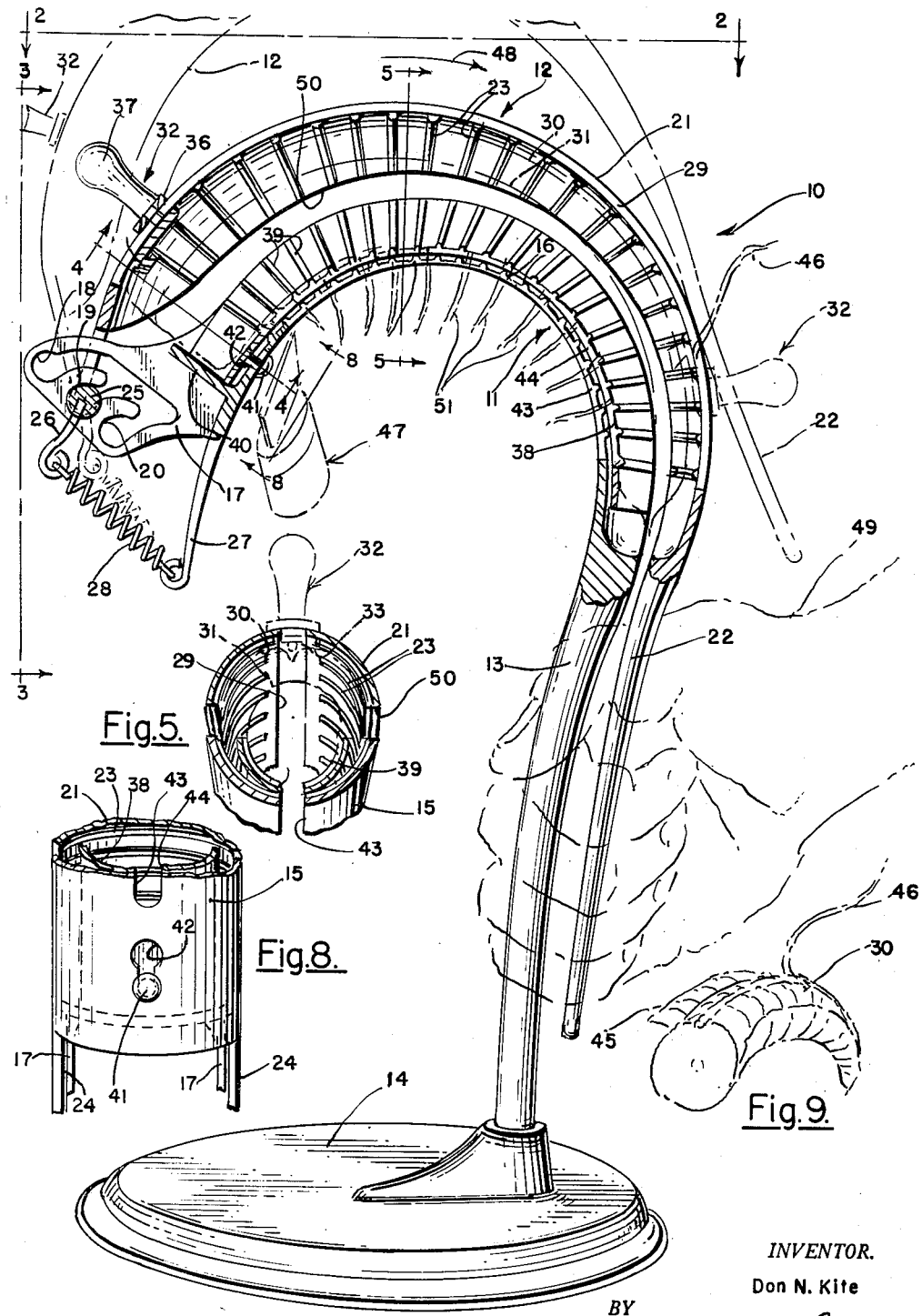
Fig. 1 is a perspective view of my invention with parts cut and broken away to show its interior construction and showing in phantom lines the opening action of the movable jaw means in connection therewith.
Fig. 5 is a cross-sectional view of my invention taken substantially on line 5—5 on Fig. 1.
Fig. 8 is a fragmentary view of the lower jaw of my invention taken looking in the direction of line 8—8 on Fig. 1 and showing the auxiliary jaw locating slot means.
Fig. 9 is a perspective view in phantom lines of a shrimp that has been shelled and de-veined by my invention, showing the relative positions of the shrimp body, the shell and vein after the shelling and de-veining operation.

Referring to the illustrations my invention is generally designated 10 and consists of a fixed lower jaw assembly 11 and an articulate upper jaw assembly 12 tapered toward the base thereof. The said fixed lower jaw assembly 11 consists of a curved and tapered jaw portion 15, a stand portion 13 and a base portion 14. Curved jaw portion 15 is provided with transverse ridge means 16 to prevent the shrimp designated 30 from slipping. Slotted hinge brackets 17 are oppositely formed, one on either side of the open end of curved jaw portion 15 and are formed into a number of spaced slot portions designated 18, 19 and 20. The articulate jaw assembly 12 consists of a curved and tapered mating jaw portion 21 and a jaw manipulating handle 22. The said curved mating jaw portion 21 is provided with transverse ridge means 23, to aid in holding of the shrimp 30 or 31 firmly in place.

Hinge extensions 24 are oppositely formed on the two sides of the open end of articulate jaw assembly 12 and are connected by a hinge pin 25, which locates within one of the slot portions 18, 19 or 20 in connection with fixed jaw assembly 11. Spring attaching prongs 26 and 27 are formed to extend from the ends of fixed jaw assembly 11 and articulate jaw assembly 12, for securing a tension spring 28 therebetween. Articulate jaw assembly 12 articulates hingably upon hinge pin 25 within one of the slot portions 18, 19 or 20, and is maintained normally in an open position by the said tension spring 28 as shown by phantom lines in Fig. 1. A knife guide slot 29 is formed longitudinally along the central top portion of curved jaw 21, to accommodate guided knife means 32, which consists of a curved knife blade 33 having a curved cutting edge 34 somewhat resembling a snowplow in shape. The edge of knife blade 33 are flared at 35 to guide and eject the vein element 46 cut from the back of the shrimp during the cleaning process. A handle 37 and lip portion 36 provide locating and manipulating means for guided knife 32 within longitudinal knife guide slot 29, The action of guided knife 32 is illustrated in Fig. 1 in solid and phantom lines with arrow 48 showing direction of its manipulation.

A stop 40 is formed at the open end of curved lower jaw portion 15 for locating shrimp 30, and to act as a stop for an auxiliary jaw element 38 of crescent shape to fit within curved jaw portion 15. The said auxiliary jaw element 38 is of smaller diameter than the jaw portion 15, to accommodate a shrimp designated 31 of smaller size. Auxiliary jaw element 38 is provided with transverse ridge means 39 and a locating rivet 41 is fixed in its forward bottom surface to engage jaw locating slot 42 in bottom jaw 15. Clearance slots 43 and 44 are longitudinally formed in the bottom of curved jaw portion 15 and auxiliary jaw element 38, to allow the shrimp legs 51 to extend therethrough and be cut off by the shearing action of a knife 47 as shown in Fig. 1. A jaw clearance 50 is provided between fixed jaw 11 and articulate jaw 12 when the larger size shrimp 30 are being cleaned, in order that the smaller size shrimp designated 31 illustrated in Fig. 4 may be firmly held by the clamping down of articulate jaw 12.

When not in use, the articulate jaw 12 of my shrimp cleaning and shelling device is normally maintained in a raised or open position as shown by phantom lines in Fig. 1, held by tension springs 28. The said articulate jaw 12 may be adjusted to shell and devein different sizes of shrimp as shown in Figs. 1 and 5 and designated 30 and 31 by varying the locating hinge pin 25 within the three locating slots 18, 19 and 20. When a smaller size shrimp, designated 31, is being cleaned the hinge pin 25 would be located preferably within slot 20 and an auxiliary jaw element 38 would be fixed within lower jaw portion 15. The guided knife 32 is normally maintained in the position shown in solid lines in Fig. 1 as the beginning of the shrimp cleaning operation.

To operate my shrimp cleaning device, a decapitated shrimp 30 or 31 is placed within the curved jaw portion 15 of fixed jaw assembly 10 with its tail toward the rear of the jaw, which is tapered in conformity with the shape of a shrimp, as shown in Figs. 1, 2 and 3. The articulate jaw assembly 12 is clamped down over the shrimp lying in fixed jaw assembly 11 and is held by hand pressing the handle 22, against stand portion 13. The fingers of the other hand manipulate the guided knife 32 in an arcuate motion in the direction of arrow 48 so that cutting edge 34 of knife blade 33 slices the shell 45 over the back of shrimp 30. Simultaneously the point of knife 34 separates and ejects the vein portion 46 from the back of the shrimp, ejecting the said vein element outward through longitudinal knife guide slot 29. The handle 22 is released and articulate jaw assembly 11 springs upwardly out of contact with the shrimp and out of the way of the fixed jaw assembly 11, permitting the shrimp 30 or 31 to be removed. When the said shrimp has been removed it will present the appearance of the shrimp in Fig. 9, with the shell 45 slit along the back and the veined element 46 together with the legs 51 removed therefrom. A single operation will lift the shrimp from the shell portion 45.

Among the important advantages residing in my invention is the speed with which shrimp, large and small, may be shelled and cleaned. This would be of particular advantage in institutions such as fish markets or restaurants where large numbers of shrimp are cleaned and prepared.

A further important advantage inherent in my invention is the adjustable feature wherein large and small sized shrimp are equally well accommodated for cleaning and deveining. Of further importance in this respect, is the fact that it does not require an expert to shell or devein shrimp using my shrimp cleaning and shelling device, as the cutting action is guided and automatic and the shrimp is not in any way mutilated as is so often the case when shrimp are shelled and deveined by hand.

Although my invention has been described, the terms used are to be deemed terms of description rather than terms of limitation, my intention being to retain the right to all mechanical equivalents of the structural elements depicted, provided they fall within the purview of the appended claims.

Having thus disclosed and revealed my invention, what I claim as new and desire to secure by Letters Patent is:

1. Shrimp cleaning and shelling device means comprising, a fixed lower jaw assembly, an upper jaw assembly articulately secured to the said fixed lower jaw assembly, guide slot means in the said upper jaw assembly, and guided knife means mounted slidably in the said guide slot means.

2. Shrimp cleaning and shelling device means comprising, a fixed lower jaw assembly, an upper jaw assembly articulately secured to the said fixed lower jaw assembly, guide slot means in the said upper jaw assembly, and guided knife means mounted slidably in the said guide slot means, both the said fixed lower jaw assembly and the said upper jaw assembly being of arcuate formation configurative with the shape of a shrimp to be confined therein.

3. Shrimp cleaning and shelling device means comprising, a fixed lower jaw assembly, an upper jaw assembly articulately secured to the said fixed lower jaw assembly, guide slot means in the said upper jaw assembly, and spring means interconnecting the said fixed lower jaw assembly and the said upper jaw assembly adjacent the point of articulation urging the latter normally to open position.

4. Shrimp cleaning and shelling device means comprising, a fixed lower jaw assembly, an upper jaw assembly articulately secured to the said fixed lower jaw assembly, guide slot means in the said upper jaw assembly, guided knife means mounted slidably in the said guide slot means, both the said fixed lower jaw assembly and the said upper jaw assembly being of arcuate formation configurative with the shape of a shrimp to be confined therein, and spring means interconnecting the said fixed lower jaw assembly and the said upper jaw assembly adjacent the point of articulation urging the latter normally to open position.

5. Shrimp cleaning and shelling device means comprising, a fixed lower jaw assembly, an upper jaw assembly articulately secured to the said fixed lower jaw assembly, guide slot means in the said upper jaw assembly, guided knife means mounted slidably in the said guide slot means, and spring means interconnecting the said fixed lower jaw assembly and the said upper jaw assembly adjacent the point of articulation urging the latter normally to open position, the said fixed lower jaw assembly being provided with a bracket portion having a multiplicity of slotted portions, the said upper jaw assembly being provided with hinge pin means adapted to function selectively within any slotted portion of the said multiplicity of slotted portions.

6. Shrimp cleaning and shelling device means comprising, a fixed lower jaw assembly, an upper jaw assembly articulately secured to the said fixed lower jaw assembly, guide slot means in the said upper jaw assembly, guided knife means mounted slidably in the said guide slot means, both the said fixed lower jaw assembly and the said upper jaw assembly being of arcuate formation configurative with the shape of a shrimp to be confined therein, and spring means interconnecting the said fixed lower jaw assembly and the said upper jaw assembly adjacent the point of articulation urging the latter normally to open position, the said fixed lower jaw assembly being provided with a bracket portion having a multiplicity of slotted portions, the said upper jaw assembly being provided with hinge pin means adapted to function selectively within any slotted portion of the said multiplicity of slotted portions.

DON N. KITE.

REFERENCES CITED

The following references are of record in the file of this patent:

UNITED STATES PATENTS

| Number | Name | Date |
| --- | --- | --- |
| 1,677,579 | Barry | July 17, 1928 |
| 2,335,806 | Sjostrom | Nov. 30, 1943 |